United States Patent
Mason

(10) Patent No.: US 6,543,566 B1
(45) Date of Patent: Apr. 8, 2003

(54) TRACTOR-MOUNTED FORKLIFT

(76) Inventor: Milford K. Mason, Rte. 1, Box 133, Litchfield, NE (US) 68852

( * ) Notice: Subject to any disclaimer, the term of this patent is extended or adjusted under 35 U.S.C. 154(b) by 255 days.

(21) Appl. No.: 09/496,087

(22) Filed: Feb. 1, 2000

Related U.S. Application Data

(62) Division of application No. 09/231,491, filed on Jan. 14, 1999, now Pat. No. 6,099,234.

(51) Int. Cl.[7] ............................................. B62D 61/12
(52) U.S. Cl. ....................... 180/209; 280/767; 414/673; 414/607; 414/920; 414/917; 414/631; 414/635; 187/222
(58) Field of Search ................................ 414/917, 667, 414/785, 540, 631, 920, 663, 664, 476, 673, 634; 280/43.23, 43.17, 43, 9, 1, 767; 187/222, 237, 238; 180/209, 198; 254/10 R, 10 B, 10 C

(56) References Cited

U.S. PATENT DOCUMENTS

| | | | |
|---|---|---|---|
| 1,451,773 A | 4/1923 | Hescock | 414/785 |
| 2,220,450 A | 11/1940 | Howell | 414/635 |
| 2,653,679 A | 9/1953 | Hamilton, Jr. | 414/426 X |
| 2,754,020 A | 7/1956 | Dunn et al. | 414/632 |
| 2,937,777 A | 5/1960 | Root | 414/636 |
| 3,086,618 A | 4/1963 | Christiansen | 414/607 X |
| 3,266,599 A | 8/1966 | Dearden | 414/607 |
| 3,574,383 A | 4/1971 | Frater | 414/719 |
| 3,754,673 A | 8/1973 | Barda et al. | 414/667 |
| 3,957,167 A | 5/1976 | Jacobson et al. | 414/763 |
| 4,079,798 A * | 3/1978 | Ferris | 280/767 X |
| 4,113,128 A | 9/1978 | Foss | 414/785 |
| 4,139,111 A | 2/1979 | Fritz | 414/636 |
| 4,177,001 A | 12/1979 | Blackwood | 414/634 X |
| 4,394,107 A | 7/1983 | Siebert | 414/631 |
| 4,421,449 A | 12/1983 | Cotton | 414/685 |
| 4,424,872 A * | 1/1984 | Granlind et al. | 180/209 X |
| 4,431,083 A | 2/1984 | York | 414/631 X |
| 4,640,662 A | 2/1987 | Spellman, Jr. | 414/642 |
| 5,150,999 A | 9/1992 | Dugan | 414/24.5 |
| 5,232,055 A | 8/1993 | Van Vuuren | 172/318 |
| 5,290,133 A | 3/1994 | Riley | 414/24.5 |
| D355,292 S | 2/1995 | Soederberg | D34/28 |
| 5,823,629 A * | 10/1998 | Smith et al. | 180/209 X |
| 5,951,236 A | 9/1999 | Thompson | 414/607 |

FOREIGN PATENT DOCUMENTS

| | | | |
|---|---|---|---|
| FI | 35964 | 1/1967 | 414/631 |
| SU | 393198 | 8/1973 | 414/920 |

* cited by examiner

Primary Examiner—Frank E. Werner
(74) Attorney, Agent, or Firm—Thomte, Mazour & Niebergall; Dennis L. Thomte

(57) ABSTRACT

A tractor-mounted forklift comprising a first frame having its rearward end secured to the underside of the tractor and having its forward end secured to the forward end of the tractor about a longitudinally extending pivot axis. A second frame is pivotally secured, about a transverse axis, to the forward end of the first frame and has a pair of ground-engaging wheels mounted at the opposite sides thereof. A hydraulic cylinder is pivotally connected to and extends between the first and second frames to pivot the second frame upwardly and downwardly with respect to the first frame. A materials handling attachment, such as a bale grapple, is mounted on a vertically movable lift which is secured to the forward end of the second frame. When the hydraulic cylinder is extended, the second frame is pivotally moved downwardly with respect to the first frame so that the weight of the product being handled is transmitted to the second frame and to the ground by means of the wheels at the outer ends thereof, rather than to the tractor.

4 Claims, 4 Drawing Sheets

TRACTOR-MOUNTED FORKLIFT

CROSS-REFERENCE TO RELATED APPLICATION

This is a divisional application of Petitioner's earlier application Ser. No. 09/231,491 filed Jan. 14, 1999, now U.S. Pat. No. 6,099,234, entitled A TRACTOR-MOUNTED FORKLIFT.

BACKGROUND OF THE INVENTION

1. Field of the Invention

This invention relates to a tractor-mounted forklift and more particularly to a forklift mounted on the front end of a tractor which includes a wheeled frame means positioned forwardly of the tractor to which the weight carried by the forklift may be transferred.

2. Description of the Related Art

Many types of front-end loaders, forklifts and load-lifting devices have been previously designed for use with tractors. Although the conventional front-end loaders may work satisfactorily when used to handle dirt, snow, etc., they do not readily adapt well for use in handling large hay bales. Although hay bale handling attachments have been designed for use on tractor front-end loaders, the weight of the load being transported or lifted by the front-end loader attachment is transferred to the front of the tractor and to the front wheels thereof which creates instability and which places undue stress loads on the front end of the tractor. Forklift devices have been previously mounted on the forward and rearward ends of tractors, but all of the weight of the hay bales or the like is carried by either the front end or rear end of the tractor which creates the instability and undue stress loads discussed above.

SUMMARY OF THE INVENTION

A forklift apparatus is described for mounting at the forward end of the tractor and which is especially designed to handle and lift large, heavy hay bales or the like, although attachments other than forklifts could conceivably be mounted on the apparatus. The forklift includes a longitudinally extending first frame having a rearward end and a forward end with the first frame being positioned beneath the tractor and having its rearward and forward ends secured to the tractor. The first frame extends forwardly from its rearward end beneath the underside of the tractor between the front wheels of the tractor. The first frame includes first and second lower pivot connections and first and second upper pivot connections at its forward end. A transversely extending second frame having first and second ends, and rearward and forward ends, is positioned forwardly of the first frame and has first and second ground-engaging wheels at the opposite ends thereof. The second frame has first and second lower pivot connections and first and second upper pivot connections at its rearward end. First, second, third and fourth parallel arms extend between the pivot connections on the first and second frames to enable the second frame to be pivotally moved upwardly and downwardly with respect to the first frame. A hydraulic cylinder is pivotally secured to and extends between the first and second frames for pivotally moving the second frame with respect to the first frame. A vertically extendible mast is secured to the second frame and has bale grapples provided thereon for grasping hay bales therebetween. When large loads are being lifted by the grapples on the mast, the hydraulic cylinder pivotally connecting the first and second frames is extended to pivotally move the second frame downwardly with respect to the first frame which effectively transfers some of the weight of the hay bales to be transferred to the second frame which is supported by the ground engaging wheels, thereby preventing undue stress loads from being supplied to the tractor. The forward end of the first frame is pivotally connected, about a longitudinally extending horizontal axis, to enable the forward end of the first frame to twist or pivot with respect to the tractor.

It is therefore a principal object of the invention to provide an improved tractor-mounted forklift.

A further object of the invention is to provide a tractor-mounted forklift which includes a frame having ground-engaging wheels to which weight may be transferred to reduce the amount of weight supplied to the forward end of the tractor.

Yet another object of the invention is to provide a tractor-mounted forklift which is stable in use.

Still another object of the invention is to provide a tractor-mounted forklift which is easily attached to a tractor and easily removed therefrom.

These and other objects will be obvious to those skilled in the art.

DESCRIPTION OF THE PREFERRED EMBODIMENT

Figure 1:
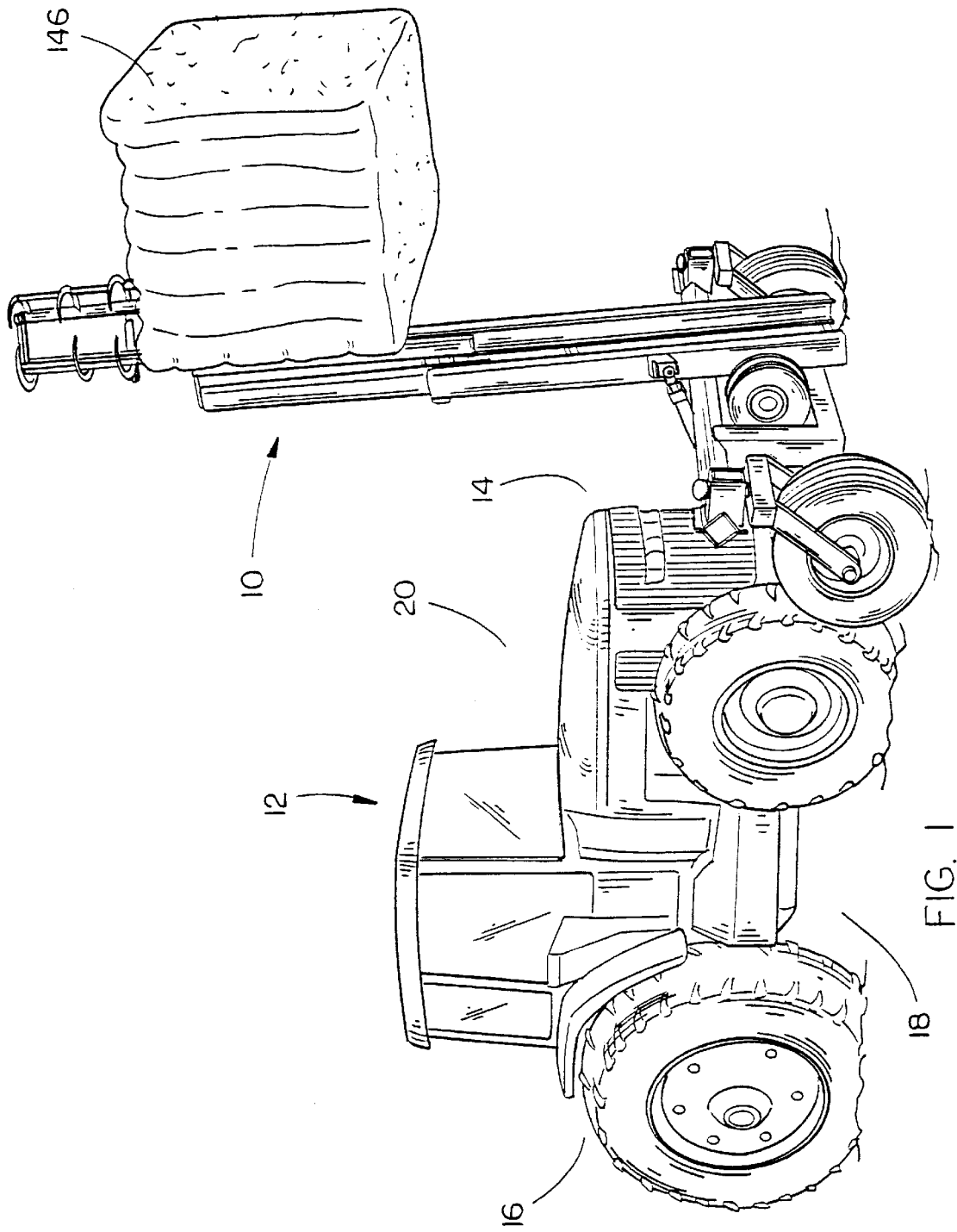
FIG. 1 is a front perspective view of the tractor-mounted forklift of this invention.

The forklift of this invention is referred to generally by the reference numeral 10 while the numeral 12 refers to a conventional tractor having a forward end 14, rearward end 16 and opposite sides 18 and 20. As stated, tractor 12 is conventional in design and includes a mounting plate 22 at its forward end which is normally adapted to have weights or other attachments mounted thereon. Tractor 12 also includes a pin 24 secured to the frame thereof at the underside thereof which is normally used to connect the forward end of the rear hitch of the tractor to the tractor. For purposes of description, the numeral 26 refers to what is generally described as the underside of the tractor.

Figure 2:
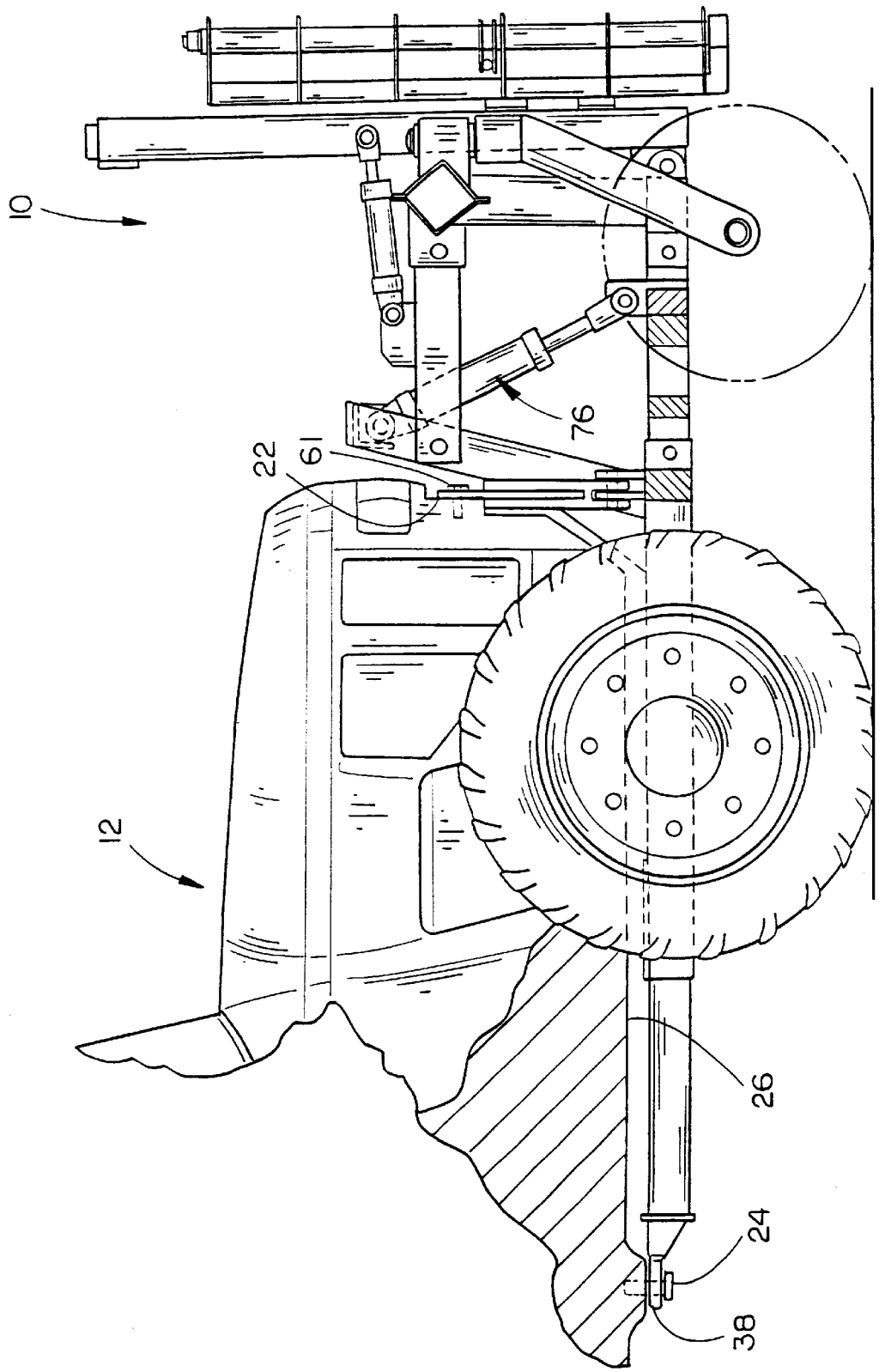
FIG. 2 is a side elevational view of the forklift of this invention mounted on a tractor with portions of the forklift being cut away to more fully illustrate the invention.

Forklift 10 includes a first frame generally comprising a pair of frame members 30 and 32 forming a pocket 34 at its rearward end which longitudinally selectively adjustably receives bar or tongue 36 having an eye fitting 38 at its rearward end which receives the pin 24, as illustrated in FIG. 2, to secure the rearward end of the first frame 28 to the tractor. Bar 36 is provided with a plurality of openings 40 formed therein which are adapted to receive the bolts 42 extending through the pocket means 34 to selectively longitudinally adjust bar 36 with respect to pocket 34.

Frame 28 includes a pair of posts 44 and 46 at the forward end thereof which extend upwardly and forwardly therefrom and which have a cross brace 48 extending between the upper ends thereof. Cross brace 50 extends between the forward ends of the frame members 30 and 32 and has a pair of brackets 52 and 54 secured thereto which extend upwardly therefrom. Plate 56 is pivotally connected, about a longitudinally extending horizontal axis, to the brackets 52 and 54 by means of pin 58. The upper end of plate 56 is secured to the mounting plate 22 on the tractor by bolts 61.

Figure 3:
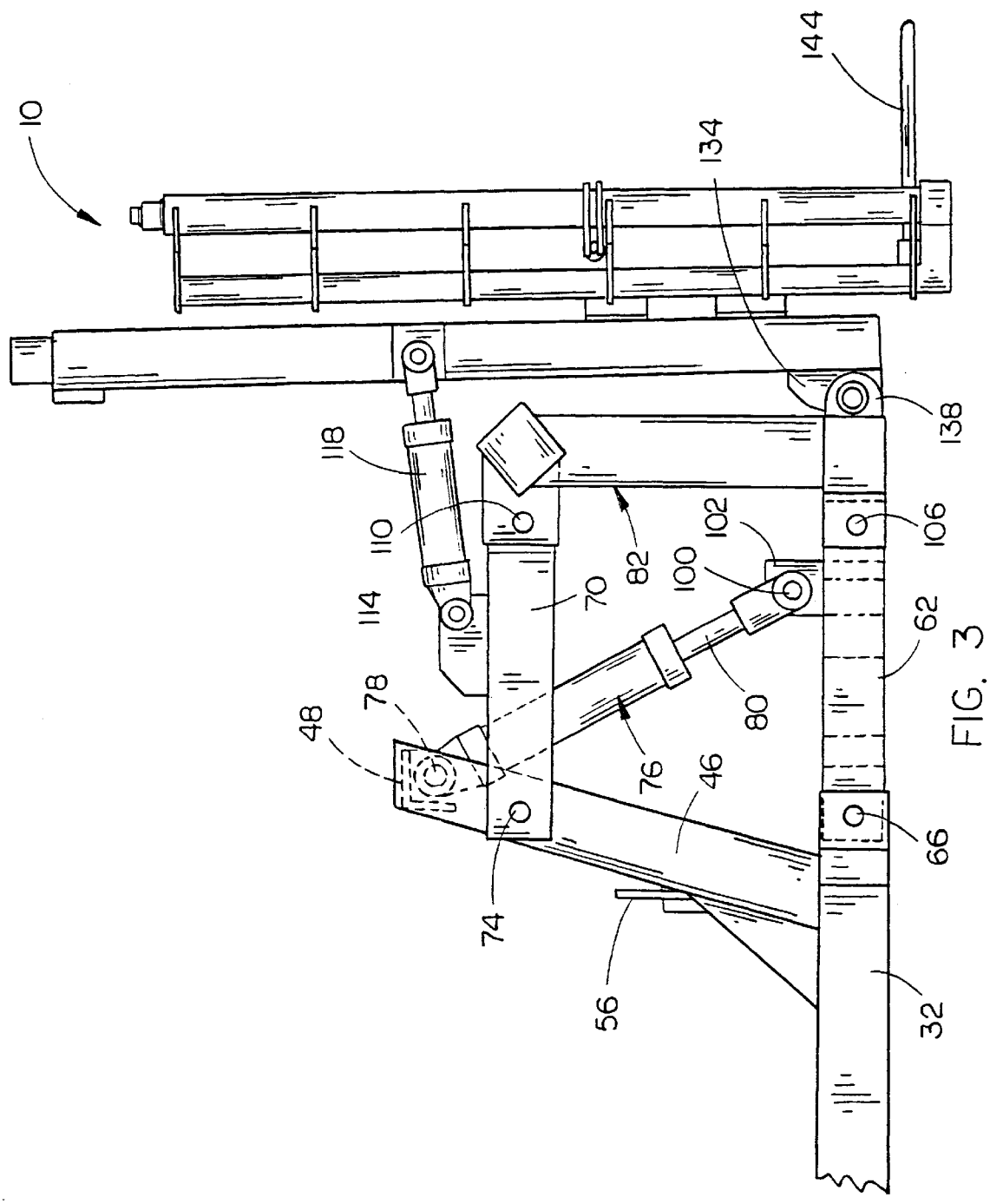
FIG. 3 is a partial side elevational view of the forklift of this invention.

Arms 60 and 62 are pivotally connected, about transverse horizontal axes, to the forward ends of frame members 30 and 32, respectively, by means of pins 64 and 66, respectively. Arms 68 and 70 are pivotally connected to posts 44 and 46 by means of pins 72 and 74, respectively. The arms 60, 62, 68 and 70 are what are referred to in the trade as "parallel arms". The upper end of hydraulic cylinder 76 is pivotally connected to cross brace 48 by means of pin 78. Hydraulic cylinder 76 includes a cylinder rod or shaft 80 extending therefrom, as seen in FIG. 3.

Figure 4:
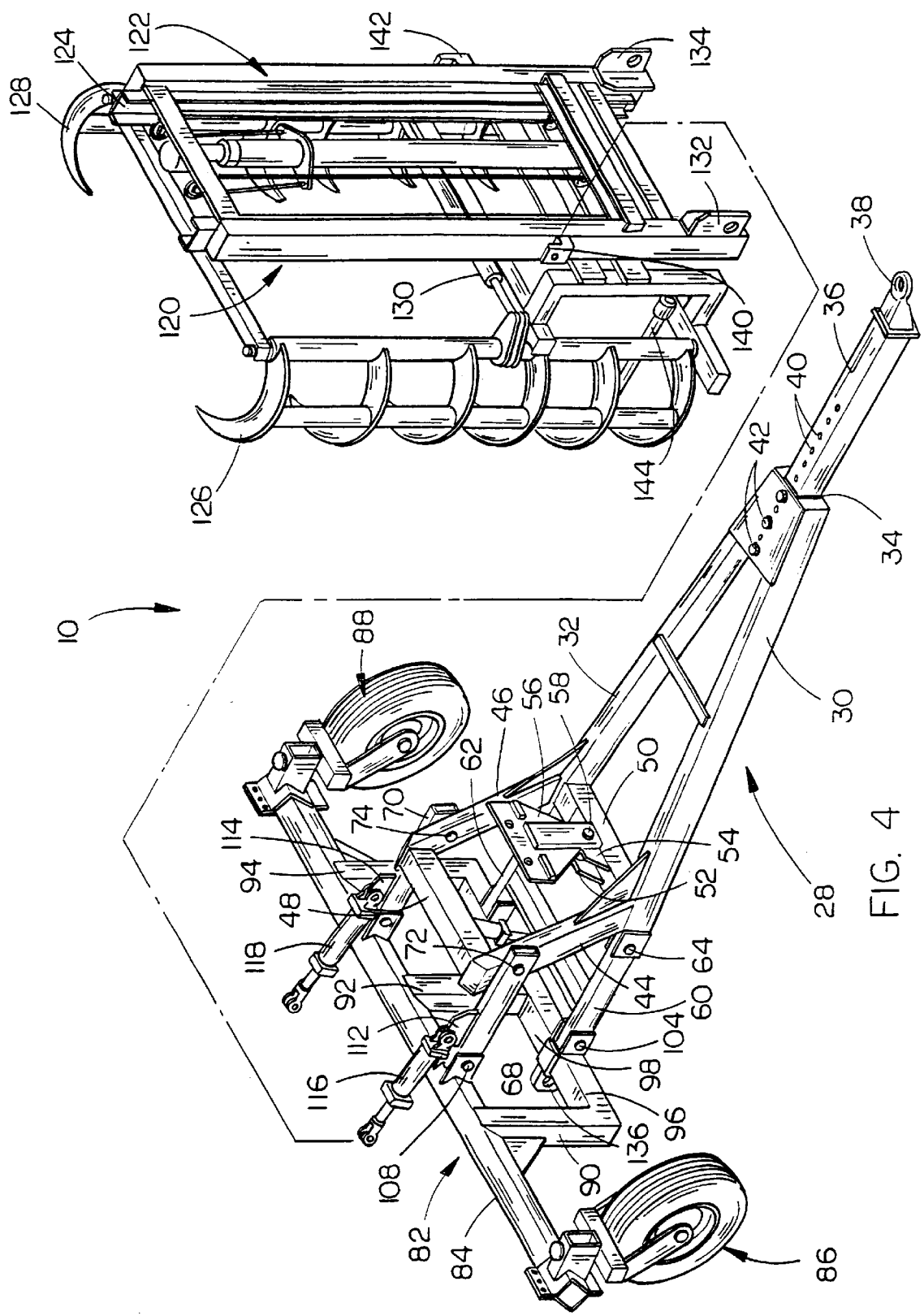
FIG. 4 is a rear perspective view illustrating the mast assembly of the forklift being removed from the frame means.

Forklift 10 also includes a second frame which is referred to generally by the reference numeral 82 and which is pivotally connected to the first frame 28 by means of the parallel arms 60, 62, 68 and 70. Frame 82 includes a transversely extending beam or tube 84 having master wheel assemblies 86 and 88 longitudinally selectively adjustably secured thereto. Frame 82 includes frame members 90, 92 and 94 which are secured to beam 84 and which extend downwardly therefrom. Frame member 96 extends between the lower ends of frame members 90, 92 and 94. Frame member 98 is secured to and is positioned rearwardly of frame member 96, as seen in FIG. 4. The lower end of cylinder shaft or rod 80 is pivotally connected to the frame member 98 by means of pin 100 extending through bracket 102 which is secured to the frame member 98 and which extends upwardly therefrom. The forward ends of arms 60 and 62 are pivotally connected to the frame member 96 by means of pins 104 and 106, respectively. The forward ends of arms 68 and 70 are pivotally connected to the beam 84 by means of pins 108 and 110, respectively. As seen in FIG. 4, arms 68 and 70 have brackets or plates 112 and 114 secured thereto which extend upwardly therefrom and which have the rear ends of hydraulic cylinders 116 and 118 pivotally connected thereto, respectively. The hydraulic cylinders 76, 116 and 118 are operatively connected to the tractor hydraulic system and the controls therefore.

The numeral 120 refers to a conventional forklift mast including a base mast portion 122 and a vertically movable mast portion 124. A pair of grapple hook assemblies 126 and 128 are operatively mounted on the movable mast portion 124 and are pivotally movable by means of hydraulic cylinder 130 to enable to the grapple hook assemblies 126 and 128 to grasp hay bales or the like therebetween. The lower end of the base mast portion 122 has a pair of brackets 132 and 134 provided thereon which are adapted to be pivotally secured to the ears 136 and 138, which extend forwardly from the frame member 98, by means of pins extending therethrough, respectively. The rod or shaft ends of the hydraulic cylinders 116 and 118 are pivotally connected to the ears or brackets 140 and 142 provided on the base mast portion 122. The extension of hydraulic cylinders 116 and 118 causes the forklift mast 120 to pivotally move forwardly with respect to the second frame 82 while the retraction of the cylinder rods of the cylinders 116 and 118 causes the upper end of the forklift mast 120 to pivotally move rearwardly towards the tractor. Preferably, one or more tine members 144 extend forwardly from the lower end of the forklift to either pass the hay bales being carried thereby or to pierce the same.

The forklift of this invention is quickly and easily secured to the tractor, as previously described, or removed therefrom in a reverse fashion. The pivotal connection of the forward end of the first frame 28 with the tractor, about pin 58, permits the forward end of the frame 28, as well as the frame 82, to twist or turn, about pin 58, with respect to the tractor. When it is desired to transport a bale 146, the tractor is driven so that the open grapple hook assemblies 126 and 128 may either grasp the sides of the bale or may grasp the end of the bale, as illustrated in FIG. 1. The grapple hook assemblies 126 and 128 are moved into piercing engagement with the bale 146 by means of the cylinder 130. When the bale 146 has been securely grasped by the grapple hook assemblies 126 and 128, as well as the tines 144, the mast assembly 124 is raised with respect to the base mast portion 122 so that the bale is moved upwardly out of engagement with its supporting surface, whether that surface be the ground or other bales. The hydraulic cylinders 116 and 118 would normally then be retracted somewhat so that the upper end of the mast assembly is tipped rearwardly towards the tractor, as viewed in FIG. 1. If the bale is extremely heavy, the hydraulic cylinder 76 is extended somewhat so that the second frame 82 is pivoted downwardly with respect to frame 28 so that the wheels 86 and 88 are moved downwardly. By pivotally moving frame 82 downwardly with respect to frame 28, the weight of the bale 146 is somewhat transferred to the ground-engaging wheels 86 and 88 to reduce the amount of load stresses which would normally be transmitted to the tractor if the wheels 86 and 88 were not utilized. In other words, if the wheels 86 and 88 are not in ground engagement, the entire weight of the forklift 10 and the bale 146 would be transferred to the tractor, thereby transmitting undue stress forces to the front wheels and to the front of the tractor. However, with the structure described herein, much of the weight of the bale 146 is transmitted to the wheels 86 and 88 rather than to the tractor itself. Not only does the forklift of this invention transmit stress forces to the second frame 82, but the ground-engaging wheels 86 and 88 provide additional stability to the forklift when the bale 146 is being raised to some height.

While it has been described that the forklift is preferably mounted at the forward end of the tractor, the forklift could be mounted at the rearward end of the tractor if so desired.

Thus it can be seen that the invention accomplishes at least all of its stated objectives.

I claim:
1. In combination:

a tractor having a forward end, a rearward end, a pair of rear wheels and a pair of front wheels;

a forklift apparatus comprising a wheeled frame pivotally secured, about a horizontal axis, to a connecting means;

said connecting means being pivotally connected, about a transverse horizontal axis, to the said wheeled frame end either the forward end or rearward end of the tractor;

a material handling attachment mounted on said wheeled frame;

and a length adjustable member pivotally secured to said wheeled frame and the said connecting means for selectively pivotally moving said wheeled frame with respect to the tractor whereby downward pivotal movement of said wheeled frame with respect to the tractor, by means of said length adjustable member, will cause at least a partial transfer of weight from said material handling attachment to said wheeled frame rather than to the tractor.

2. The combination of claim 1 wherein said length adjustable member comprises a hydraulic cylinder.

3. A forklift apparatus for use on a tractor having a forward end, a rearward end, a pair of rear wheels and a pair of front wheels;

said forklift apparatus comprising:
   (a) a wheeled frame pivotally secured, about a horizontal axis to the forward end of the tractor;
   (b) a material handling attachment mounted on said wheeled frame;
   (c) a length adjustable member pivotally interconnecting said wheeled frame and the tractor for selectively pivotally moving said wheeled frame with respect to the tractor whereby downward pivotal movement of said wheeled frame with respect to the tractor, by means of said length adjustable member, will cause at least a partial transfer of weight from said material handling attachment to said wheeled frame rather than to the tractor.

4. A forklift apparatus for use on a tractor having a forward end, a rearward end, a pair of rear wheels and a pair of front wheels;

said forklift apparatus comprising:
   (d) a wheeled frame pivotally secured, about a horizontal axis to the rearward end of the tractor;
   (e) a material handling attachment mounted on said wheeled frame;
   (f) a length adjustable member pivotally interconnecting said wheeled frame and the tractor for selectively pivotally moving said wheeled frame with respect to the tractor whereby downward pivotal movement of said wheeled frame with respect to the tractor, by means of said length adjustable member, will cause at least a partial transfer of weight from said material handling attachment to said wheeled frame rather than to the tractor.

* * * * *